United States Patent
Wu

(10) Patent No.: US 11,902,835 B2
(45) Date of Patent: *Feb. 13, 2024

(54) METHOD AND DEVICE FOR CONFIGURING DATA FLOW

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 44 days.

This patent is subject to a terminal disclaimer.

(21) Appl. No.: 17/893,793

(22) Filed: Aug. 23, 2022

(65) Prior Publication Data

US 2022/0408314 A1     Dec. 22, 2022

Related U.S. Application Data

(63) Continuation of application No. 17/035,454, filed on Sep. 28, 2020, now Pat. No. 11,470,508, which is a continuation of application No. PCT/CN2019/080986, filed on Apr. 2, 2019.

(30) Foreign Application Priority Data

Apr. 2, 2018    (CN) .......................... 201810284187.0

(51) Int. Cl.
*H04W 28/10*      (2009.01)
*H04W 28/02*      (2009.01)
(Continued)

(52) U.S. Cl.
CPC ......... *H04W 28/10* (2013.01); *H04L 41/0803* (2013.01); *H04L 41/5003* (2013.01);
(Continued)

(58) Field of Classification Search
None
See application file for complete search history.

(56) References Cited

U.S. PATENT DOCUMENTS 11,109,262 B2 *   8/2021   Pan ..................... H04W 76/12
11,134,527 B2 *   9/2021   Chang ................. H04W 76/11
(Continued)

FOREIGN PATENT DOCUMENTS

CN       105704197 A    6/2016
GB         2559840 A    8/2018
(Continued)

OTHER PUBLICATIONS

ITRI., "Discussion on SDAP header format," 3GPP TSG-RAN WG2 Meeting #99, R2-1709084, pp. 1-3, (Aug. 12, 2017).
(Continued)

*Primary Examiner* — Kenny S Lin
(74) *Attorney, Agent, or Firm* — Maschoff Brennan

(57) ABSTRACT

A method and device for configuring a data flow are disclosed in embodiments of this disclosure. The method includes: transmitting indication information to an SDAP entity receiving end if a DRB corresponding to a QoS data flow is changed from a source DRB to a target DRB. The indication information is used to indicate that transmission of a first QoS data flow is completed on the source DRB or transmission of data of a second QoS data flow starts on the target DRB. Data of the QoS data flow includes data of the first QoS data flow and data of the second QoS data flow.

20 Claims, 4 Drawing Sheets transmitting indication information to an SDAP entity receiving end if a DRB corresponding to a QoS data flow is changed from a source DRB to a target DRB     ~ 101

(51) Int. Cl.
*H04L 41/0803* (2022.01)
*H04L 41/5003* (2022.01)
*H04L 69/22* (2022.01)

(52) U.S. Cl.
CPC ......... *H04L 69/22* (2013.01); *H04W 28/0252* (2013.01); *H04W 28/0268* (2013.01)

(56) References Cited

U.S. PATENT DOCUMENTS

| | | | |
|---|---|---|---|
| 11,381,994 B2* | 7/2022 | Chang | H04W 28/0252 |
| 2017/0303287 A1 | 10/2017 | Yu et al. | |
| 2018/0083688 A1 | 3/2018 | Agiwal et al. | |
| 2020/0008118 A1 | 1/2020 | Han et al. | |
| 2020/0067843 A1 | 2/2020 | Li et al. | |
| 2020/0077317 A1 | 3/2020 | Sharma et al. | |
| 2020/0169912 A1 | 5/2020 | Chang et al. | |

FOREIGN PATENT DOCUMENTS

| | | |
|---|---|---|
| WO | 2018/026169 A1 | 2/2018 |
| WO | 2019/028896 A1 | 2/2019 |

OTHER PUBLICATIONS

MediaTek Inc., "SDAP header design for reflective QoS indication and QoS flow remapping," 3GPP TSG-RAN WG2 Meeting #99, R2-1708260, pp. 1-7, (Aug. 25, 2017).

Huawei et al., "QoS Flow to DRB Re-Mapping," 3GPP TSG-RAN WG2 Meeting #99, R2-1708938 (Resubmission of R2-1706787), pp. 1-6, (Aug. 25, 2017).

Vivo., "Discussion on the configuration of SDAP," 3GPP TSG-RAN WG2 Meeting #99bis, R2-1710933 (Revision of R2-1708500), pp. 1-5, (Oct. 9, 2017).

Huawei et al., "QoS Flow to DRB Re-Mapping," 3GPP TSG-RAN WG2 Meeting #100, R2-1712395 (Revision of R2-1710288), pp. 1-3, (Nov. 27, 2017).

Xiaomi., "QoS Flow Remapping," 3GPP TSG-RAN2 #100, R2-1712378 (Resubmitted R2-1711068), pp. 1-4, (Dec. 1, 2017).

ITL., "QoS Flow Remapping," 3GPP TSG-RAN WG2 NR Ad Hoc, R2-1801515, pp. 1-3, (Jan. 22, 2018).

Vivo., "Discussion on the QoS flow remapping," 3GPP TSG-RAN WG2 Meeting #101bis, R2-1804695, pp. 1-5, (Apr. 16, 2018).

International Search Report and Written Opinion of the International Searching Authority dated Jul. 1, 2019 as received In Application No. PCT/CN2019/080986.

CN Office Action dated Mar. 27, 2020 as received in Application No. 201810284187.0.

IN Patent Examination Report dated Sep. 15, 2021 as received in Application No. 202027045652.

U.S. Non-Final Office Action dated Nov. 23, 2021 as received in U.S. Appl. No. 17/035,454.

JP First Office Action dated Dec. 6, 2021 as received in Application No. 2020-553466.

U.S. Final Office Action dated Mar. 18, 2022 as received in U.S. Appl. No. 17/035,454.

JP Second Office Action dated Aug. 8, 2022 as received in Application No. 2020-553466.

* cited by examiner

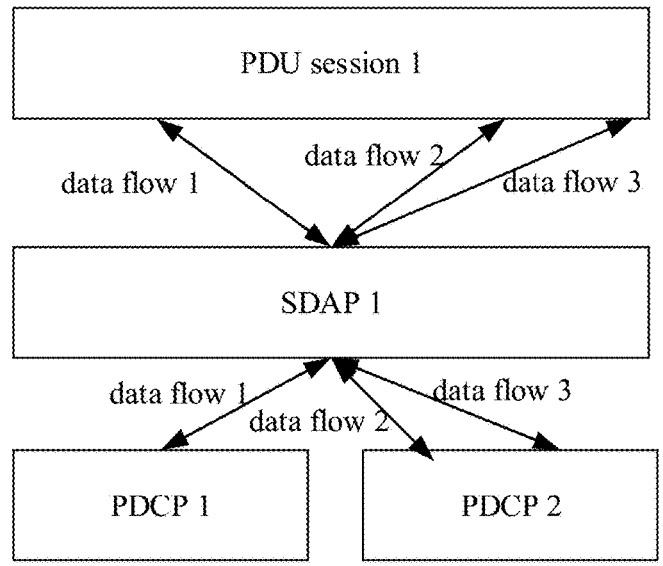
Fig.1
transmitting indication information to an SDAP entity receiving end if a DRB corresponding to a QoS data flow is changed from a source DRB to a target DRB — 101
Fig.2
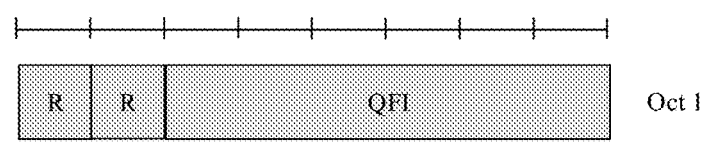
Fig.3

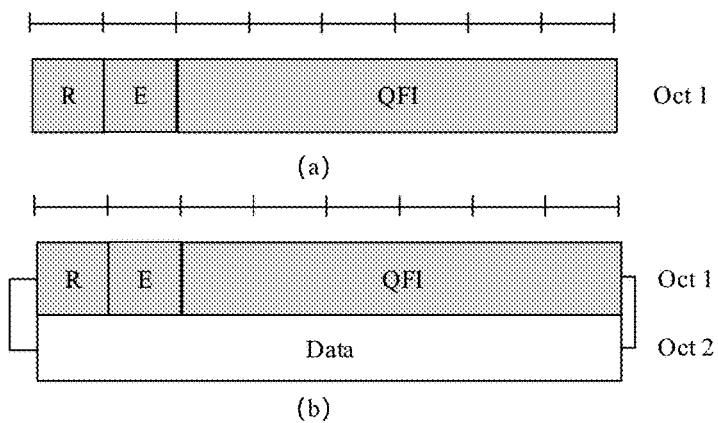

Fig.4

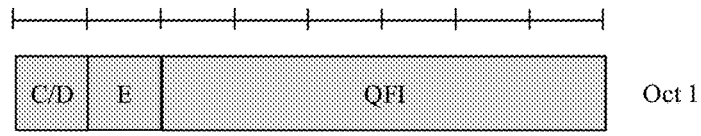

Fig.5

| receiving indication information from an SDAP entity transmitting end if a DRB corresponding to a QoS data flow is changed from a source DRB to a target DRB | ⎯ 201 |

Fig.6

| if a DRB corresponding to a QoS data flow is changed from a source DRB to a target DRB and data of the QoS data flow includes data of a first QoS data flow and data of a second QoS data flow, receiving the data of the first QoS data flow through the source DRB, and receiving the data of the second QoS data flow through the target DRB | ⎯ 301 |

| performing data processing on the data of the QoS data flow based on a preset data processing rule | ⎯ 302 |

Fig.7

METHOD AND DEVICE FOR CONFIGURING DATA FLOW

CROSS-REFERENCE TO RELATED APPLICATION

The present application is a continuation of U.S. patent application Ser. No. 17/035,454 filed on Sep. 28, 2020, which is a continuation application of International Application No. PCT/CN2019/080986 filed on Apr. 2, 2019, which claims a priority to the Chinese patent application No. 201810284187.0 filed in China on Apr. 2, 2018, a disclosure of which is incorporated herein by reference in their entireties.

TECHNICAL FIELD

The present disclosure relates to the field of communications, in particular to a method and a device for configuring a data flow.

BACKGROUND

A network side quality-of-service (Quality-of-Service, QoS) indication mechanism has been introduced in $5^{th}$-generation ($5^{th}$-Generation, 5G) mobile communication systems, therefore QoS indication information (e.g., QoS flow identifier (Identifier, ID)) for IP data flow of user equipment (User Equipment, UE) needs to be added for both uplink and downlink data transmission. The protocol layer is located above the packet data convergence protocol (Packet Data Convergence Protocol, PDCP) layer. As shown in FIG. 1, one service data adaptation protocol (Service Data Adaptation Protocol, SDAP) entity corresponds to one higher-layer protocol data unit (Protocol Data Unit, PDU) session, and one SDAP entity may transmit data flows to a plurality of different data radio bearers (Data Radio Bearers, DRBs) which correspond to a plurality of PDCP entities as shown in FIG. 1.

A network side is capable of re-configuring (for example, when a handover occurs) a DRB of a receiving end or transmitting end for a data flow (e.g., QoS data flow 1) of a terminal device, that is, the network side changes the DRB of the receiving end or transmitting end from a DRB1 (i.e., source DRB) to a DRB2 (i.e., target DRB).

However, after the DRB corresponding to the receiving end or transmitting end of the SDAP entity is changed from the source DRB to the target DRB, since data flows in different DRBs arrive at the receiving end in a sequence, how to ensure that the received data flows are delivered to a higher-layer protocol entity according to a sequence in which the data flows arrive at the receiving end remains a problem.

SUMMARY

An object of embodiments of the present disclosure is to provide a method and a device for configuring a data flow, so as to solve the problem in the related art that how to ensure that the received data flows are delivered to a higher-layer protocol entity according to a sequence in which the data flows arrive at the receiving end.

To solve the above technical problem, the following embodiments of the present disclosure are provided.

In a first aspect, a method for configuring a data flow is provided. The method is operable by an SDAP entity transmitting end and includes:

transmitting indication information to an SDAP entity receiving end if a DRB corresponding to a QoS data flow is changed from a source DRB to a target DRB, wherein the indication information is configured to indicate that transmission of a first QoS data flow is completed on the source DRB or transmission of data of a second QoS data flow starts on the target DRB, and data of the QoS data flow includes data of the first QoS data flow and data of the second QoS data flow.

In a second aspect, a method for configuring a data flow is provided. The method is operable by an SDAP entity receiving end and includes:

receiving indication information from an SDAP entity transmitting end if a DRB corresponding to a QoS data flow is changed from a source DRB to a target DRB, wherein the indication information is configured to indicate that transmission of data of the QoS data flow is completed on the source DRB or transmission of data of the QoS data flow starts on the target DRB.

In a third aspect, a method for configuring a data flow is provided. The method is operable by an SDAP entity receiving end and includes:

if a DRB corresponding to a QoS data flow is changed from a source DRB to a target DRB and data of the QoS data flow includes data of a first QoS data flow and data of a second QoS data flow, receiving the data of the first QoS data flow through the source DRB, and receiving the data of the second QoS data flow through the target DRB;

performing data processing on the data of the QoS data flow based on a preset data processing rule;

wherein the preset data processing rule at least includes:

not transmitting the data of the QoS data flow to other protocol layer entity;

not transmitting the data of the second QoS data flow to other protocol layer entity, and sequentially transmitting the data of the first QoS data flow to the other protocol layer entity according to a receiving sequence of the data of the first QoS data flow;

storing the data of the first QoS data flow and the data of the second QoS data flow.

In a fourth aspect, a device for configuring a data flow is provided. The device includes:

a transmission unit configured to transmit indication information to an SDAP entity receiving end if a DRB corresponding to a QoS data flow is changed from a source DRB to a target DRB, wherein the indication information is configured to indicate that transmission of a first QoS data flow is completed on the source DRB or transmission of data of a second QoS data flow starts on the target DRB, and data of the QoS data flow includes data of the first QoS data flow and data of the second QoS data flow.

In a fifth aspect, a device for configuring a data flow is provided. The device includes:

a reception unit configured to receive indication information from an SDAP entity transmitting end if a DRB corresponding to a QoS data flow is changed from a source DRB to a target DRB, wherein the indication information is configured to indicate that transmission of data of the QoS data flow is completed on the source DRB or transmission of data of the QoS data flow starts on the target DRB.

In a sixth aspect, a device for configuring a data flow is provided. The device includes:

a reception unit configured to, if a DRB corresponding to a QoS data flow is changed from a source DRB to a target DRB and data of the QoS data flow includes data of a first QoS data flow and data of a second QoS data flow, receive the data of the first QoS data flow through the source DRB, and receive the data of the second QoS data flow through the target DRB;

a processing unit configured to perform data processing on the data of the QoS data flow based on a preset data processing rule;

wherein the preset data processing rule at least includes:

not transmitting the data of the QoS data flow to other protocol layer entity;

not transmitting the data of the second QoS data flow to other protocol layer entity, and sequentially transmitting the data of the first QoS data flow to the other protocol layer entity according to a receiving sequence of the data of the first QoS data flow;

storing the data of the first QoS data flow and the data of the second QoS data flow.

It can be seen from the foregoing technical solutions provided in the embodiments of the present disclosure that the solutions of the embodiments of the present disclosure have at least one of the following technical effects.

In embodiments of the present disclosure, the SDAP entity transmitting end may transmit indication information to the SDAP entity receiving end if a DRB corresponding to a QoS data flow is changed from a source DRB to a target DRB, the indication information can be configured to indicate that transmission of a first data flow is completed on the source DRB or transmission of data of a second QoS data flow starts on the target DRB, such that after receiving the indication information, the SDAP entity receiving end may distinguish and process the QoS data flow received through the source DRB and the QoS data flow received through the target DRB differently, thereby ensuring that the SDAP entity receiving end sequentially delivers the received QoS data flows to a higher-layer protocol entity according to a sequence in which the QoS data flows arrive at the receiving end.

In embodiments of the present disclosure, the SDAP entity receiving end may receive indication information from the SDAP entity transmitting end if a DRB corresponding to a QoS data flow is changed from a source DRB to a target DRB, the indication information can be configured to indicate that transmission of the first data flow is completed on the source DRB or transmission of the second QoS data flow starts on the target DRB, such that after receiving the indication information, the SDAP entity receiving end may distinguish and process the QoS data flow received through the source DRB and the QoS data flow received through the target DRB differently, thereby ensuring that the SDAP entity receiving end sequentially delivers the received QoS data flows to a higher-layer protocol entity according to a sequence in which the QoS data flows arrive at the receiving end.

In embodiments of the present disclosure, the SDAP entity receiving end may receive the first QoS data flow through the source DRB and receive the second QoS data flow through the target DRB when a DRB corresponding to a QoS data flow is changed from a source DRB to a target DRB, and then perform data processing on the QoS data flow based on a preset data processing rule, so as to distinguish and process the first QoS data flow and the second QoS data flow differently, thereby ensuring that the SDAP entity receiving end sequentially delivers the received QoS data flows to a higher-layer protocol entity according to a sequence in which the QoS data flows arrive at the receiving end.

BRIEF DESCRIPTION OF THE DRAWINGS

To better clarify technical solutions of embodiments of the present application or in the related art, drawings used in description of the embodiments or the related art are briefly introduced hereinafter. Apparently, the described drawings merely illustrate some of the embodiments set forth in the present application. A person of ordinary skill in the art can obtain other drawings based on the described drawings without any creative efforts.

FIG. 1 is a schematic diagram of transmission of data flows in the related art;

FIG. 2 is a schematic flow diagram of an implementation process of a method for configuring a data flow according to an embodiment of the present disclosure;

FIG. 3 is a schematic diagram of a data format used in the transmission of indication information according to an embodiment of the present disclosure;

FIG. 4 is another schematic diagram of a data format used in the transmission of indication information according to an embodiment of the present disclosure;

FIG. 5 is still another schematic diagram of a data format used in the transmission of indication information according to an embodiment of the present disclosure;

FIG. 6 is another schematic flow diagram of an implementation process of a method for configuring a data flow according to an embodiment of the present disclosure;

FIG. 7 is still another schematic flow diagram of an implementation process of a method for configuring a data flow according to an embodiment of the present disclosure;

DETAILED DESCRIPTION

Figure 8:
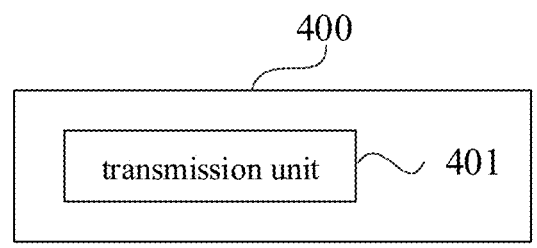
FIG. 8 is a schematic structural diagram of a device for configuring a data flow according to an embodiment of the present disclosure.

To enable a better understanding of the technical solutions in the present application for those skilled in the art, the technical solutions in embodiments of the present disclosure are described clearly in conjunction with drawings in the embodiments of the present disclosure. Apparently, the described embodiments are merely a part of rather than all the embodiments of the present application. All other embodiments obtained by a person ordinary skilled in the art based on the embodiments of the present application fall within the scope of the present application.

The technical solutions of the present application may be applied to various communication systems, such as global system of mobile communication (Global System of Mobile communication, GSM), code division multiple access (Code Division Multiple Access, CDMA) system, wideband code division multiple access (Wideband Code Division Multiple Access, WCDMA), general packet radio service (General Packet Radio Service, GPRS), long term evolution (Long Term Evolution, LTE)/long term evolution advanced (Long Term Evolution Advanced, LTE-A), and new radio (New Radio, NR).

User equipment (User Equipment, UE), also called mobile terminal, mobile user equipment, etc., may communicate with one or more core networks via a radio access network (Radio Access Network, RAN). The UE may be a mobile terminal, e.g., a mobile phone (or cellular phone) or a computer provided with a mobile terminal, such as a portable, pocket-sized, handheld, computer built-in or in-vehicle mobile apparatus, which exchanges voice and/or data with the RAN.

A base station may be a base transceiver station (Base Transceiver Station, BTS) in GSM or CDMA, or may be a NodeB in WCDMA, or may be an evolutional Node B (eNB or eNodeB) in LTE or a 5G base station (gNB), which is not limited in the present application. However, for ease of description, a gNB is used as an example in description of following embodiments.

As described in the background section, in the related art, when the DRB corresponding to a QoS data flow varies, e.g., the DRB is changed from a DRB1 (i.e., source DRB) to a DRB2 (i.e., target DRB), since data transmitted through different DRBs arrive at the receiving end in different sequences, and a solution as to how to ensure that, after data transmitted through the different DRBs arrive at the receiving end, the receiving end delivers (namely, transmits) the data transmitted through different DRBs to other protocol layer entity, namely, a higher-layer protocol entity (e.g., an Internet protocol (Internet Protocol, IP) layer), according to a sequence in which the data transmitted through the different DRBs arrive at the receiving end is still needed, it is necessary to propose a method for configuring a data flow on the basis of the related art, to ensure that, in the case that the DRB corresponding to a QoS data flow varies, after data transmitted through different DRBs arrive at the receiving end, the data transmitted through the different DRBs can still be sequentially delivered to a higher-layer protocol entity according to a sequence in which the data transmitted through the different DRBs arrive at the receiving end.

To solve this problem, specific configuration information for an SDAP entity may be pre-configured by a network side or specified in a protocol in embodiments of the present disclosure. The specific configuration information may include one of or any combination of: 1) indication information carrying an SDAP header; 2) whether indication information is transmitted; 3) a quantity of time the indication information is transmitted.

FIG. 2 is a schematic diagram of an implementation process of a method for configuring a data flow according to an embodiment of the present disclosure. The method in FIG. 2 is performed by an SDAP entity transmitting end. The method includes a step 101: transmitting indication information to an SDAP entity receiving end if a DRB corresponding to a QoS data flow is changed from a source DRB to a target DRB.

The indication information is used to indicate that transmission of a first QoS data flow is completed on the source DRB or transmission of data of a second QoS data flow starts on the target DRB, and data of the QoS data flow includes data of the first QoS data flow and data of the second QoS data flow.

Optionally, the indication information is in one of following formats: format 1, an SDAP header without carrying a data portion; format 2, an SDAP header including at least one reserved indication bit; format 3, an SDAP header including at least one reserved indication bit, and the SDAP header including at least one reserved indication bit being a control packet; where the reserved indication bit is used to indicate the indication information.

When the format of the indication information is format 1, namely, an SDAP header without carrying a data portion, if the SDAP entity receiving end receives an SDAP packet transmitted by the SDAP entity transmitting end, and the SDAP packet is an SDAP header without carrying a data portion, it is indicated that the SDAP entity receiving end receives the indication information. FIG. 3 is a schematic diagram of an indication information format which is an SDAP header without carrying a data portion according to an embodiment of the present disclosure. FIG. 3 is a schematic diagram of one octet (abbreviated as Oct) of data. The Oct1 includes 8 bits, where the first two bits (shown as R) are reserved bits with a value of 0, and the remaining 6 bits (shown as QFI) are used to indicate a QoS data flow ID.

When the format of the indication information is format 2, namely, an SDAP header including at least one reserved indication bit, if the SDAP entity receiving end receives an SDAP packet transmitted by the SDAP entity transmitting end, and the SDAP packet is an SDAP header including at least one reserved indication bit, it is indicated that the SDAP entity receiving end receives the indication information. FIG. 4 is a schematic diagram of an indication information format which is format 2 according to an embodiment of the present disclosure. FIG. 4(a) is a schematic diagram of one Oct of data, where the first bit (shown as R) is a reserved bit with a value of 0, the second bit (shown as E) is a reserved indication bit with a value of 1, and the remaining 6 bits (shown as QFI) are used to indicate a QoS data flow ID. FIG. 4(b) is a schematic diagram of two Octs of data, where 8 bits in the Oct1 are the same as that in FIG. 4(a) and Oct2 is carried data portion (shown as Data). In other words, when the format of the indication information is format 2, the SDAP packet may not carry a data portion or may carry a data portion.

When the format of the indication information is format 3, namely, an SDAP header including at least one reserved indication bit, and the SDAP header including at least one reserved indication bit being a control packet, if the SDAP entity receiving end receives an SDAP packet transmitted by the SDAP entity transmitting end, and the SDAP packet is an SDAP header including at least one reserved indication bit, and the SDAP header including at least one reserved indication bit being a control packet, it is indicated that the SDAP entity receiving end receives the indication information. FIG. 5 is a schematic diagram of an indication information format which is format 3 according to an embodiment of the present disclosure. FIG. 5 is a schematic diagram of one Oct of data, where the first bit (shown as C/D) is a bit used to indicate whether the SDAP packet is a data packet or a control packet, where a value of the first bit being 0 indicates that the SDAP packet is a data packet and a value of the first bit being 1 indicates that the SDAP packet is a control packet; the second bit (shown as E) is a reserved indication bit with a value of 1, and the remaining 6 bits (shown as QFI) are used to indicate a QoS data flow ID. In other words, when the format of the indication information is format 3, the indication information is valid only when the conditions that the bit C/D has a value of 1, that is, the packet is a control packet, and the reserved indication bit E has a value of 1 are satisfied simultaneously.

It is understood, since the RLC entity for the source DRB or the target DRB has three operation modes: acknowledged mode (Acknowledged Mode, AM), unacknowledged mode (Unacknowledged Mode) and transparent mode (Transparent Mode), in order to ensure the reliability of data transmission, an embodiment of the present disclosure provides an optional solution, that is, a quantity of times the indication information is transmitted may be determined based on the operation mode of the radio link control (Radio Link Control, RLC) entity for the DRB used for transmitting the indication information; where the DRB used for transmitting the indication information is the source DRB or the target DRB.

The quantity of times the indication information is transmitted may be determined based on the operation mode of the RLC entity for the DRB. In specific, if the operation mode of the RLC entity for the DRB used for transmitting the indication information is AM, since the AM mode itself can ensure the reliability of data transmission, it may be determined that the quantity of times the indication information is transmitted is 1. If the operation mode of the RLC entity for the DRB is UM or TM, since these two operation modes cannot ensure the reliability of data transmission by themselves, it may be determined that the quantity of times the indication information is transmitted is N, where N is a positive integer greater than 1. In other words, in these two operation modes, indication information may be repetitively transmitted multiple times to the SDAP entity receiving end, to ensure that the indication information can be received by the SDAP entity receiving end.

The N may have the following values: N is equal to a preset quantity of times of transmission; N is less than the preset quantity of times of transmission; N is less than or equal to the preset quantity of times of transmission; N is greater than the preset quantity of times of transmission; N is greater than or equal to the preset quantity of times of transmission; here, the preset quantity of times of transmission is configured by a protocol or pre-configured by a network side device.

Optionally, since the change of DRB corresponding to the QoS data flow from the source DRB to the target DRB usually occurs at the moment when the terminal device is handed over, the process tends to be relatively short. To avoid cumbersome operation and implementation, the transmitting the indication information to the SDAP entity receiving end may specifically include transmitting the indication information to the SDAP entity receiving end M times, where M is a positive integer greater than or equal to 1. Here, in the case that M is a positive integer greater than 1, regardless of whether the operation mode of the RLC entity for DRB is AM, UM or TM, the indication information may be repetitively transmitted to the SDAP entity receiving end multiple times (M times) to ensure the reliability of data transmission.

The M may have the following values: M is equal to a preset quantity of times of transmission; M is less than the preset quantity of times of transmission; M is less than or equal to the preset quantity of times of transmission; M is greater than the preset quantity of times of transmission; M is greater than or equal to the preset quantity of times of transmission; here, the preset quantity of times of transmission is configured by a protocol or pre-configured by a network side device.

Optionally, the transmitting the indication information to the SDAP entity receiving end may be triggered under the following two conditions: condition 1, data of QoS data flow is not stored; condition 2, data of QoS data flow is stored, and after last data of the QoS data flow is transmitted to the source DRB. In order words, if the condition 1 is met, that is, if data of QoS data flow is not stored, the indication information is transmitted to the SDAP entity receiving end; if the condition 2 is met, that is, if data of QoS data flow is stored, after last data of the QoS data flow is transmitted to the source DRB, the indication information is transmitted to the SDAP entity receiving end.

It is understood, in embodiments of the present disclosure, data of the second QoS data flow may further be transmitted through the target DRB. In specific, the transmitting the data of the second QoS data flow through the target DRB includes the following two cases: case 1, if transmission of the indication information starts, transmitting the data of the second QoS data flow through the target DRB; case 2, if transmission of the indication information is completed, transmitting the data of the second QoS data flow through the target DRB. Further, the data of the second QoS data flow may be transmitted through the target DRB immediately when it is determined that the DRB corresponding to the QoS data flow is changed from the source DRB to the target DRB.

Optionally, in embodiments of the present disclosure, the transmitting the indication information to the SDAP entity receiving end may specifically include: transmitting the indication information to the SDAP entity receiving end through the source DRB, or transmitting the indication information to the SDAP entity receiving end through the target DRB.

In embodiments of the present disclosure, the SDAP entity transmitting end may transmit indication information to the SDAP entity receiving end when a DRB corresponding to a QoS data flow is changed from a source DRB to a target DRB, the indication information can be used to indicate that transmission of a first data flow is completed on the source DRB or transmission of data of a second QoS data flow starts on the target DRB, such that after receiving the indication information, the SDAP entity receiving end may distinguish and process the QoS data flow received through the source DRB and the QoS data flow received through the target DRB differently, thereby ensuring that the SDAP entity receiving end sequentially delivers the received QoS data flows to a higher-layer protocol entity according to a sequence in which the QoS data flows arrive at the receiving end.

FIG. 6 is another schematic diagram of an implementation process of a method for configuring a data flow according to an embodiment of the present disclosure. The method in FIG. 6 is performed by an SDAP entity receiving end. The method includes a step 201: receiving indication information from an SDAP entity transmitting end if a DRB corresponding to a QoS data flow is changed from a source DRB to a target DRB, where the indication information is used to indicate that transmission of data of the QoS data flow is completed on the source DRB or transmission of data of the QoS data flow starts on the target DRB.

Optionally, in this case, the data of the QoS data flow may further be received, then the data of the QoS data flow is transmitted to other protocol layer entity. Since a DRB corresponding to a QoS data flow is changed from a source DRB to a target DRB, the following situation will result: a part of the QoS data flow is received through the source DRB and the other part is received through the target DRB. For ease of description, the two parts of data may be referred to as a first QoS data flow and a second QoS data flow. Thus, a QoS data flow includes the first QoS data flow and the second QoS data flow.

Therefore, receiving the data of the QoS data flow includes: receiving data of the first QoS data flow through the source DRB; and receiving data of the second QoS data flow through the target DRB.

Optionally, the transmitting the data of the QoS data flow to other protocol layer entity may specifically include: firstly, sequentially transmitting the data of the first QoS data flow to other protocol layer entity according to a receiving sequence of the data of the first QoS data flow; then, sequentially transmitting the data of the second QoS data flow to other protocol layer entity according to a receiving sequence of the data of the second QoS data flow. In other words, the data received earlier (i.e., data of the first QoS data flow that is received through the source DRB) is delivered to other protocol layer entity in the first place.

Optionally, the receiving the indication information from the SDAP entity transmitting end may include: receiving the indication information from the SDAP entity transmitting end through the source DRB, or receiving the indication information through the target DRB.

Since it is further needed to deliver data of the QoS data flow to other protocol layer after the data of the QoS data flow is received, data of the first QoS data flow and data of the second QoS data flow may further be stored. In order to easily distinguish the receiving sequence of data of the first QoS data flow and the second QoS data flow, and ensure that, in delivering these data to other protocol layer entity (e.g., a higher-layer protocol entity IP layer), these data are sequentially delivered according to the receiving sequence of these data, in embodiments of the present disclosure, storing the first QoS data flow and the second QoS data flow may specifically include: storing the data of the first QoS data flow and the data of the second QoS data flow according to a receiving sequence of the data of the first QoS data flow and the second QoS data flow.

Since the first QoS data flow and the second QoS data flow are received through the source DRB and the target DRB respectively, data of the first QoS data flow is preceding to the data of the second QoS data flow in terms of receiving sequence. In order to easily distinguish the two QoS data flows, the data flows may be stored in the following two manners: in a manner, the data of the first QoS data flow may be stored at a first storage position, and the data of the second QoS data flow may be stored at a second storage position; in the other manner, the data of the first QoS data flow and the data of the second QoS data flow may be stored at a target storage position (i.e., stored at the same position), and the data of the first QoS data flow is assigned with a label different from that assigned to the data of the second QoS data flow.

In embodiments of the present disclosure, the SDAP entity receiving end may receive indication information from the SDAP entity transmitting end when a DRB corresponding to a QoS data flow is changed from a source DRB to a target DRB, the indication information can be used to indicate that transmission of the first data flow is completed on the source DRB or transmission of the second QoS data flow starts on the target DRB, such that after receiving the indication information, the SDAP entity receiving end may distinguish and process the QoS data flow received through the source DRB and the QoS data flow received through the target DRB differently, thereby ensuring that the SDAP entity receiving end sequentially delivers the received QoS data flows to a higher-layer protocol entity according to a sequence in which the QoS data flows arrive at the receiving end.

FIG. 7 is still another schematic diagram of an implementation process of a method for configuring a data flow according to an embodiment of the present disclosure. The method in FIG. 7 is performed by an SDAP entity receiving end. The method includes:

a step 301: if a DRB corresponding to a QoS data flow is changed from a source DRB to a target DRB and data of the QoS data flow includes data of a first QoS data flow and data of a second QoS data flow, receiving the data of the first QoS data flow through the source DRB, and receiving the data of the second QoS data flow through the target DRB;

a step 302: performing data processing on the data of the QoS data flow based on a preset data processing rule;

where the preset data processing rule at least includes: not transmitting the data of the QoS data flow to other protocol layer entity; not transmitting the data of the second QoS data flow to other protocol layer entity, and sequentially transmitting the data of the first QoS data flow to the other protocol layer entity according to a receiving sequence of the data of the first QoS data flow; storing the data of the first QoS data flow and the data of the second QoS data flow.

Optionally, in order to easily distinguish the receiving sequence of data of the first QoS data flow and the second QoS data flow, and ensure that, in delivering (namely, transmitting) these data to other protocol layer entity (e.g., a higher-layer protocol entity IP layer), these data are sequentially delivered according to the receiving sequence of these data, in embodiments of the present disclosure, storing the first QoS data flow and the second QoS data flow may specifically include: storing the data of the first QoS data flow and the data of the second QoS data flow according to a receiving sequence of the data of the first QoS data flow and the second QoS data flow.

Since the first QoS data flow and the second QoS data flow are received through the source DRB and the target DRB respectively, data of the first QoS data flow is preceding to the data of the second QoS data flow in terms of receiving sequence. In order to easily distinguish the two QoS data flows, the data flows may be stored in the following two manners: in a manner, the data of the first QoS data flow may be stored at a first storage position, and the data of the second QoS data flow may be stored at a second storage position; in the other manner, the data of the first QoS data flow and the data of the second QoS data flow may be stored at a target storage position (i.e., stored at the same position), and the data of the first QoS data flow is assigned with a label different from that assigned to the data of the second QoS data flow.

In embodiments of the present disclosure, the SDAP entity receiving end may receive the first QoS data flow through the source DRB and receive the second QoS data flow through the target DRB when a DRB corresponding to a QoS data flow is changed from a source DRB to a target DRB, and then perform data processing on the QoS data flow based on a preset data processing rule, so as to distinguish and process the first QoS data flow and the second QoS data flow differently, thereby ensuring that the SDAP entity receiving end sequentially delivers the received QoS data flows to a higher-layer protocol entity according to a sequence in which the QoS data flows arrive at the receiving end.

FIG. 8 is a schematic structural diagram of a device 400 for configuring a data flow according to an embodiment of the present disclosure. As shown in FIG. 8, the device 400 for configuring a data flow may include a transmission unit 401.

The transmission unit 401 is configured to transmit indication information to an SDAP entity receiving end if a DRB corresponding to a QoS data flow is changed from a source DRB to a target DRB, where the indication information is used to indicate that transmission of a first QoS data flow is completed on the source DRB or transmission of data of a second QoS data flow starts on the target DRB, and data of the QoS data flow includes data of the first QoS data flow and data of the second QoS data flow.

Optionally, the indication information is in one of following formats:

an SDAP header without carrying a data portion; an SDAP header including at least one reserved indication bit; an SDAP header including at least one reserved indication bit, and the SDAP header including at least one reserved indication bit being a control packet;

where the reserved indication bit is used to indicate the indication information.

Optionally, the device further includes:

a determination unit 402 configured to determine, based on an operation mode of an RLC entity for a DRB used for transmitting the indication information, a quantity of times the indication information is transmitted;

where the DRB used for transmitting the indication information is the source DRB or the target DRB.

Optionally, the determination unit 402 is configured to:

determine that the quantity of times the indication information is transmitted is 1, if the operation mode of the RLC entity for the DRB used for transmitting the indication information is an acknowledged mode AM;

determine that the quantity of times the indication information is transmitted is N, if the operation mode of the RLC entity for the DRB is an unacknowledged mode UM or a transparent mode TM, where the N is a positive integer greater than 1.

Optionally, the N is equal to a preset quantity of times of transmission; the N is less than the preset quantity of times of transmission; the N is less than or equal to the preset quantity of times of transmission; the N is greater than the preset quantity of times of transmission; the N is greater than or equal to the preset quantity of times of transmission; where the preset quantity of times of transmission is configured by a protocol or pre-configured by a network side.

Optionally, the transmission unit 401 is configured to:

transmit the indication information to the SDAP entity receiving end M times, where the M is a positive integer greater than or equal to 1.

Optionally, the M is equal to a preset quantity of times of transmission; the M is less than the preset quantity of times of transmission; the M is less than or equal to the preset quantity of times of transmission; the M is greater than the preset quantity of times of transmission; the M is greater than or equal to the preset quantity of times of transmission; where the preset quantity of times of transmission is configured by a protocol or pre-configured by a network side.

Optionally, the transmission unit 401 is configured to:

if data of the QoS data flow is not stored, transmit the indication information to the SDAP entity receiving end;

if data of the QoS data flow is stored, transmit the indication information to the SDAP entity receiving end after last data of the QoS data flow is transmitted to the source DRB.

Optionally, the device further includes:

a first transmission unit 403 configured to transmit data of the second QoS data flow through the target DRB.

The device 400 for configuring a data flow may also implement the method in FIG. 2. For a specific implementation, a reference may be made to the embodiment as shown in FIG. 2.

Figure 9:
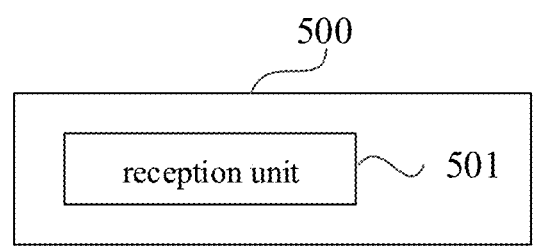
FIG. 9 is another schematic structural diagram of a device for configuring a data flow according to an embodiment of the present disclosure.

FIG. 9 is another schematic structural diagram of a device 500 for configuring a data flow according to an embodiment of the present disclosure. As shown in FIG. 9, the device 500 for configuring a data flow may include a reception unit 501.

The reception unit 501 is configured to receive indication information from an SDAP entity transmitting end if a DRB corresponding to a QoS data flow is changed from a source DRB to a target DRB, where the indication information is used to indicate that transmission of data of the QoS data flow is completed on the source DRB or transmission of data of the QoS data flow starts on the target DRB.

Optionally, the device further includes:

a first reception unit 502 configured to receive the data of the QoS data flow;

a transmission unit 503 configured to transmit the data of the QoS data flow to other protocol layer entity.

Optionally, the QoS data flow includes a first QoS data flow and a second QoS data flow, where the first reception unit 502 is configured to:

receive data of the first QoS data flow through the source DRB; and, receive data of the second QoS data flow through the target DRB.

Optionally, the transmission unit 503 is configured to:

sequentially transmit the data of the first QoS data flow to other protocol layer entity according to a receiving sequence of the data of the first QoS data flow;

after sequentially transmitting the data of the first QoS data flow to the other protocol layer entity according to the receiving sequence of the data of the first QoS data flow, sequentially transmit the data of the second QoS data flow to other protocol layer entity according to a receiving sequence of the data of the second QoS data flow.

Optionally, the reception unit 501 is configured to:

receive the indication information through the source DRB or target DRB.

Optionally, the device further includes:

a storage unit 504 configured to store the data of the first QoS data flow and the data of the second QoS data flow.

Optionally, the storage unit 504 is configured to:

store the data of the first QoS data flow and the data of the second QoS data flow according to a receiving sequence of the data of the first QoS data flow and the second QoS data flow.

Optionally, the storage unit 504 is configured to:

store the data of the first QoS data flow at a first storage position, and store the data of the second QoS data flow at a second storage position; or, store the data of the first QoS data flow and the data of the second QoS data flow at a target storage position, and assign a label to the data of the first QoS data flow while assigning a different label to the data of the second QoS data flow.

The device 500 for configuring a data flow may also implement the method in FIG. 6. For a specific implementation, a reference may be made to the embodiment as shown in FIG. 6.

Figure 10:
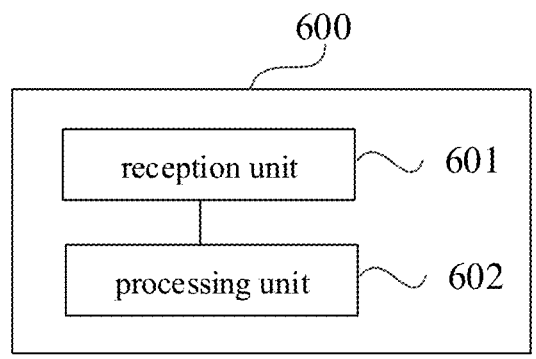
FIG. 10 is still another schematic structural diagram of a device for configuring a data flow according to an embodiment of the present disclosure.

FIG. 10 is still another schematic structural diagram of a device 600 for configuring a data flow according to an embodiment of the present disclosure. As shown in FIG. 10, the device 600 for configuring a data flow may include a reception unit 601 and a processing unit 602.

The reception unit 601 is configured to, if a DRB corresponding to a QoS data flow is changed from a source DRB to a target DRB and data of the QoS data flow includes data of a first QoS data flow and data of a second QoS data flow, receive the data of the first QoS data flow through the source DRB, and receive the data of the second QoS data flow through the target DRB.

The processing unit 602 is configured to perform data processing on the data of the QoS data flow based on a preset data processing rule.

where the preset data processing rule at least includes:

not transmitting the data of the QoS data flow to other protocol layer entity;

not transmitting the data of the second QoS data flow to other protocol layer entity, and sequentially transmitting the data of the first QoS data flow to the other protocol layer entity according to a receiving sequence of the data of the first QoS data flow;

storing the data of the first QoS data flow and the data of the second QoS data flow.

Optionally, when storing the first QoS data flow and the second QoS data flow, the processing unit 602 is configured to:

store the data of the first QoS data flow and the data of the second QoS data flow according to a receiving sequence of the data of the first QoS data flow and the second QoS data flow.

Optionally, the processing unit 602 is configured to:

store the data of the first QoS data flow at a first storage position, and store the data of the second QoS data flow at a second storage position; or, store the data of the first QoS data flow and the data of the second QoS data flow at a target storage position, and assign a label to the data of the first QoS data flow while assigning a different label to the data of the second QoS data flow.

The device 600 for configuring a data flow may also implement the method in FIG. 7. For a specific implementation, a reference may be made to the embodiment as shown in FIG. 7.

Figure 11:
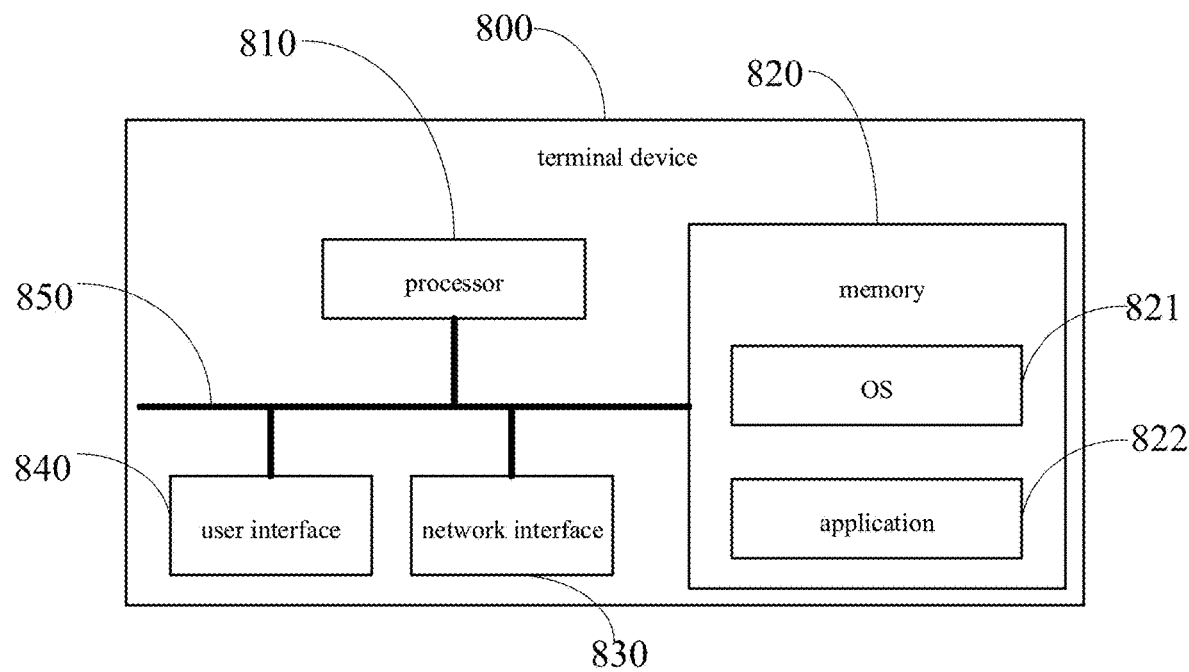
FIG. 11 is a schematic structural diagram of a terminal device according to an embodiment of the present disclosure.

FIG. 11 is a schematic structural diagram of a terminal device according to an embodiment of the present disclosure. As shown in FIG. 11, a terminal device 800 includes: at least one processor 810, a memory 820, at least one network interface 830, and a user interface 840. The various components in the terminal device 800 are coupled together by a bus system 850. It may be understood that the bus system 850 is configured to implement connection and communication among these components. The bus system 850 further includes a power bus, a control bus, and a status signal bus in addition to a data bus. However, for clarity of description, various buses in FIG. 11 are all labeled as the bus system 850.

The user interface 840 may include a display, a keyboard or a point-and-click device (for example, a mouse), a trackball, a touch pad, a touch screen, or the like.

It may be understood that the memory 820 in embodiments of the present disclosure may be a volatile memory or a nonvolatile memory, or may include both a volatile memory and a nonvolatile memory. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM), which is used as an external cache. By way of example rather than limitation, many forms of RAMs such as a static RAM (Static RAM, SRAM), a dynamic RAM (Dynamic RAM, DRAM), a synchronous DRAM (Synchronous DRAM, SDRAM), a double-data-rate SDRAM (Double Data Rate SDRAM, DDRSDRAM), an enhanced SDRAM (Enhanced SDRAM, ESDRAM), a synchlink DRAM (Synchlink DRAM, SLDRAM), and a direct Rambus RAM (Direct Rambus RAM, DRRAM) may be used. The memory 820 in the system and method described in embodiments of the present disclosure is intended to include, but is not limited to, these and any other appropriate types of memories.

In some implementations, the memory 820 stores executable modules or data structures, or a subset thereof, or an extended set thereof, for example, an operating system (Operating System, OS) 821 and an application 822.

The operating system 821 includes various system programs, such as a framework layer program, a core library layer program, and a driver layer program, to implement various basic services and process a hardware-based task. The application 822 includes various applications such as a media player or a browser, to implement various application services. A program for implementing the method provided in embodiments of the present disclosure may be included in the application 822.

In embodiments of the present disclosure, the terminal device 800 further includes a computer program stored in the memory 820 and configured to be executed by the processor 810. The processor 810 is configured to execute the computer program to implement various processes of the foregoing methods for configuring a data flow, and may achieve the same technical effects. To avoid repetition, a detailed description is omitted herein.

The foregoing methods disclosed in embodiments of the present disclosure may be applied to the processor 810 or implemented by the processor 810. The processor 810 may be an integrated circuit chip having a signal processing capability. During implementation, the steps in the foregoing methods may be accomplished by hardware integrated logic circuits or instructions in a software form in the processor 810. The processor 810 may be a general-purpose processor, a digital signal processor (Digital Signal Processor, DSP), an application specific integrated circuit (Application Specific Integrated Circuit, ASIC), a field programmable gate array (Field Programmable Gate Array, FPGA) or other programmable logic device, discrete gate or transistor logic device, a discrete hardware component, that can implement or execute the methods, steps, and logic block diagrams disclosed in some embodiments of the present disclosure. The general-purpose processor may be a microprocessor or the processor may be any conventional processor or the like. The steps of the methods for configuring a data flow disclosed with reference to the embodiments of the present disclosure may be directly performed and accomplished by a hardware decoding processor, or performed and accomplished by a combination of hardware and software modules in a decoding processor. The software modules may reside in a computer-readable storage medium well-established in the art, such as a RAM, a flash memory, a ROM, a PROM or an electrically erasable programmable memory or a register. A computer-readable storage medium is located in the memory 820. The processor 810 reads information from the memory 820 and accomplishes the steps in the foregoing methods using hardware of the processor 810. Specifically, a computer program is stored in the computer-readable storage medium. The computer program is configured to be executed by the processor 810 to implement the steps in the method embodiments of the foregoing methods for configuring a data flow.

It may be understood that these embodiments described in this disclosure may be implemented by hardware, software, firmware, middleware, microcode or a combination thereof. For hardware implementation, a processing unit may be implemented in one or more ASICs, a DSP, a DSP device (DSP Device, DSPD), a programmable logic device (Programmable Logic Device, PLD), an FPGA, a general-purpose processor, a controller, a microcontroller, a microprocessor, other electronic unit configured to perform the functions in the present disclosure or a combination thereof.

For a software implementation, the techniques described in embodiments of the present disclosure may be implemented by modules (for example, processes or functions) performing the functions described in embodiments of the present disclosure. Software codes may be stored in a memory and executed by a processor. The memory may be implemented internal or external to a processor.

Figure 12:
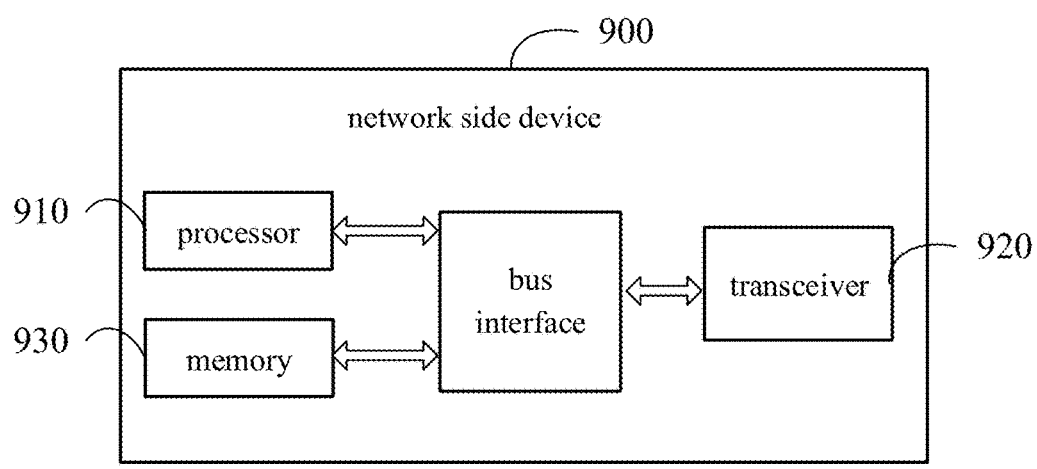
FIG. 12 is a schematic structural diagram of a network side device according to an embodiment of the present disclosure.

FIG. 12 is a schematic structural diagram of a network side device according to another embodiment of the present disclosure. As shown in FIG. 12, a network side device 900 includes: a processor 910, a transceiver 920, a memory 930, and a bus interface.

In an embodiment of the present disclosure, the network side device 900 further includes a computer program stored in the memory 930 and executable by the processor 910, where the processor 910 is configured to execute the computer program to implement various processes of the foregoing methods for configuring a data flow, and may achieve the same technical effects. To avoid repetition, a detailed description is omitted herein.

In FIG. 12, a bus architecture may include any quantity of interconnected buses and bridges, and connects various circuits including one or more processors represented by the processor 910 and memory represented by the memory 930. The bus architecture may also connect various other circuits such as peripherals, voltage regulators and power management circuits, which is well known in the art. Therefore, a further description thereof is omitted herein. A bus interface provides an interface. The transceiver 920 may be multiple elements, such as a transmitter and a receiver, to allow for communication with various other apparatuses on the transmission medium.

The processor 910 is responsible for supervising the bus architecture and normal operation, and the memory 930 may store the data being used by the processor 910 during operation.

An embodiment of the present disclosure further provides a computer readable storage medium storing therein a computer program, where the computer program is configured to be executed by a processor to implement various processes of the foregoing methods for configuring a data flow, and may achieve the same technical effects. To avoid repetition, a detailed description thereof is omitted herein. The computer readable storage medium includes a read-only memory (Read-Only Memory, ROM), a random access memory (Random Access Memory, RAM), a magnetic disk, an optic disc or the like.

The above descriptions merely describe preferred embodiments of the present disclosure, but the scope of the present disclosure is not limited thereto. Any modifications, equivalent replacements or improvements made without departing from the spirit and principle of the disclosure shall fall within the scope of the present disclosure.

The system, device, module or unit set forth in the foregoing embodiments may specifically implemented by a computer chip or entity, or implemented by a product have a certain function. A typical implementation device is a computer. In specific, the computer may be, for example: a personal computer, a laptop computer, a cellular phone, a camera phone, a smart phone, a personal digital assistant, a media player, a navigation device, an email device, a game console, a tablet computer, a wearable device, or any combination thereof.

The computer readable storage medium includes permanent and non-permanent, removable and non-removable media, and may achieve information storage by any means or techniques. Information may be computer readable instruction, data structure, program module or other data. Computer storage medium may, for example, include, but is not limited to: phase change random access memory (Phase Change Random Access Memory, PRAM), static random access memory (Static Random Access Memory, SRAM), dynamic random access memory (Dynamic Random Access Memory, DRAM), other types of RAMs, ROM, EEPROM, flash memory or other memory technologies, compact disc read-only memory (Compact Disc Read-Only Memory, CD-ROM), digital versatile disc (Digital Versatile Disc, DVD) or other optical storages, cassette tape, magnetic tape, magnetic disk or other magnetic storage device or any other non-transmitting medium, which is configured to store information accessible by a computing device. According to the definition herein, the computer readable medium does not include transitory media, such as modulated data signals and carriers.

It is noted that terms "include," "have," and any variations thereof in the present disclosure are intended to cover a non-exclusive inclusion meaning, such that a process, a method, an article, or a device that includes a list of elements not only includes the list of elements, but also may include other elements not expressly listed or include elements inherent to the process, the method, the article, or the device. An element preceded by "includes or including" does not preclude existence of additional identical elements in the process, the method, the article, or the device including the element.

The embodiments provided in the specification are described in a progressive manner, the same or similar part among various embodiments may be referred with each other, and the description of each embodiment focuses on its difference from other embodiments. Particularly, since system embodiments are basically similar to method embodiments, the descriptions of the system embodiments are relatively simple, for the relevant description, references may be made to the description of the method embodiments.

What is claimed is:

1. A computer readable storage medium, comprising a computer program stored thereon, wherein the computer program is configured to be executed by a processor to implement:

transmitting indication information to an SDAP entity receiving end if a data radio bearer (DRB) corresponding to a quality of service (QoS) data flow is changed from a source DRB to a target DRB, wherein the indication information is configured to indicate that transmission of a first QoS data flow is completed on the source DRB or transmission of data of a second QoS data flow starts on the target DRB, and data of the QoS data flow comprises data of the first QoS data flow and data of the second QoS data flow;

wherein the indication information is in one of following formats:

an SDAP header without carrying a data portion;

an SDAP header comprising at least one reserved indication bit, and the SDAP header comprising at least one reserved indication bit being a control packet; and wherein the reserved indication bit is used to indicate the indication information;

wherein the SDAP header occupies only one octet.

2. The computer readable storage medium according to claim 1, wherein the computer program is configured to be executed by the processor to further implement:

determining, based on an operation mode of a radio link control (RLC) entity for a DRB used for transmitting the indication information, a quantity of times the indication information is transmitted;

wherein the DRB used for transmitting the indication information is the source DRB or the target DRB.

3. The computer readable storage medium according to claim 2, wherein when determining, based on an operation mode of a radio link control (RLC) entity for a DRB used for transmitting the indication information, a quantity of times the indication information is transmitted, the computer program is configured to be executed by the processor to further implement:
   determining that the quantity of times the indication information is transmitted is 1, if the operation mode of the RLC entity for the DRB used for transmitting the indication information is an acknowledged mode (AM);
   determining that the quantity of times the indication information is transmitted is N, if the operation mode of the RLC entity for the DRB is an unacknowledged mode (UM) or a transparent mode (TM), wherein the N is a positive integer greater than 1.

4. The computer readable storage medium according to claim 3, wherein
   the N is equal to a preset quantity of times of transmission; or,
   the N is less than the preset quantity of times of transmission; or,
   the N is less than or equal to the preset quantity of times of transmission; or,
   the N is greater than the preset quantity of times of transmission; or,
   the N is greater than or equal to the preset quantity of times of transmission;
   wherein the preset quantity of times of transmission is configured by a protocol or pre-configured by a network device.

5. The computer readable storage medium according to claim 1, wherein when transmitting the indication information to the SDAP entity receiving end, the computer program is configured to be executed by the processor to further implement:
   transmitting the indication information to the SDAP entity receiving end for M times, wherein the M is a positive integer greater than or equal to 1.

6. The computer readable storage medium according to claim 5, wherein
   the M is equal to a preset quantity of times of transmission; or,
   the M is less than the preset quantity of times of transmission; or,
   the M is less than or equal to the preset quantity of times of transmission; or,
   the M is greater than the preset quantity of times of transmission; or,
   the M is greater than or equal to the preset quantity of times of transmission;
   wherein the preset quantity of times of transmission is configured by a protocol or pre-configured by a network device.

7. The computer readable storage medium according to claim 1, wherein when transmitting the indication information to the SDAP entity receiving end, the computer program is configured to be executed by the processor to further implement:
   if data of the QoS data flow is not stored, transmitting the indication information to the SDAP entity receiving end;
   if data of the QoS data flow is stored, transmitting the indication information to the SDAP entity receiving end after last data of the QoS data flow is transmitted to the source DRB.

8. The computer readable storage medium according to claim 1, wherein the computer program is configured to be executed by the processor to further implement:
   transmitting data of the second QoS data flow through the target DRB.

9. The computer readable storage medium according to claim 8, wherein when transmitting data of the second QoS data flow through the target DRB, the computer program is configured to be executed by the processor to further implement:
   if transmission of the indication information starts, transmitting the data of the second QoS data flow through the target DRB;
   if transmission of the indication information is completed, transmitting the data of the second QoS data flow through the target DRB.

10. A terminal device, comprising a processor, a memory, a network interface and a user interface, wherein the memory stores therein a computer program configured to be executed by the processor, and the processor is configured to execute the computer program to implement:
    receiving indication information from an SDAP entity transmitting end if a data radio bearer (DRB) corresponding to a quality of service (QoS) data flow is changed from a source DRB to a target DRB, wherein the indication information is configured to indicate that transmission of data of the QoS data flow is completed on the source DRB or transmission of data of the QoS data flow starts on the target DRB;
    wherein the indication information is in one of following formats:
    an SDAP header without carrying a data portion;
    an SDAP header comprising at least one reserved indication bit, and the SDAP header comprising at least one reserved indication bit being a control packet; and
    wherein the reserved indication bit is used to indicate the indication information;
    wherein the SDAP header occupies only one octet.

11. The terminal device according to claim 10, wherein the processor is configured to execute the computer program to further implement:
    receiving the data of the QoS data flow;
    transmitting the data of the QoS data flow to other protocol layer entity.

12. The terminal device according to claim 11, wherein the QoS data flow comprises a first QoS data flow and a second QoS data flow;
    when receiving the data of the QoS data flow, the processor is configured to execute the computer program to implement:
    receiving data of the first QoS data flow through the source DRB; and,
    receiving data of the second QoS data flow through the target DRB.

13. The terminal device according to claim 12, wherein the processor is configured to execute the computer program to further implement:
    storing the data of the first QoS data flow and the data of the second QoS data flow.

14. The terminal device according to claim 13, wherein when storing the data of the first QoS data flow and the data of the second QoS data flow, the processor is configured to execute the computer program to implement:

storing the data of the first QoS data flow and the data of the second QoS data flow according to a receiving sequence of the data of the first QoS data flow and the second QoS data flow;

or, wherein when storing the data of the first QoS data flow and the data of the second QoS data flow, the processor is configured to execute the computer program to implement:

storing the data of the first QoS data flow at a first storage position, and storing the data of the second QoS data flow at a second storage position; or, storing the data of the first QoS data flow and the data of the second QoS data flow at a target storage position, and assigning a label to the data of the first QoS data flow while assigning a different label to the data of the second QoS data flow.

15. The terminal device according to claim 10, wherein the processor is configured to execute the computer program to further implement:

data of the QoS data flow comprises data of a first QoS data flow and data of a second QoS data flow, receiving the data of the first QoS data flow through the source DRB, and receiving the data of the second QoS data flow through the target DRB;

performing data processing on the data of the QoS data flow based on a preset data processing rule;

wherein the preset data processing rule at least comprises:

not transmitting the data of the QoS data flow to other protocol layer entity;

not transmitting the data of the second QoS data flow to other protocol layer entity, and sequentially transmitting the data of the first QoS data flow to the other protocol layer entity according to a receiving sequence of the data of the first QoS data flow;

storing the data of the first QoS data flow and the data of the second QoS data flow.

16. A computer readable storage medium, comprising a computer program stored thereon, wherein the computer program is configured to be executed by a processor to implement:

receiving indication information from an SDAP entity transmitting end if a data radio bearer (DRB) corresponding to a quality of service (QoS) data flow is changed from a source DRB to a target DRB, wherein the indication information is configured to indicate that transmission of data of the QoS data flow is completed on the source DRB or transmission of data of the QoS data flow starts on the target DRB;

wherein the indication information is in one of following formats:

an SDAP header without carrying a data portion;

an SDAP header comprising at least one reserved indication bit, and the SDAP header comprising at least one reserved indication bit being a control packet; and wherein the reserved indication bit is used to indicate the indication information;

wherein the SDAP header occupies only one octet.

17. The computer readable storage medium according to claim 16, wherein the computer program is configured to be executed by the processor to further implement:

receiving the data of the QoS data flow;

transmitting the data of the QoS data flow to other protocol layer entity.

18. The computer readable storage medium according to claim 17, wherein the QoS data flow comprises a first QoS data flow and a second QoS data flow;

when receiving the data of the QoS data flow, the computer program is configured to be executed by the processor to further implement:

receiving data of the first QoS data flow through the source DRB; and, receiving data of the second QoS data flow through the target DRB.

19. The computer readable storage medium according to claim 18, wherein the computer program is configured to be executed by the processor to further implement:

storing the data of the first QoS data flow and the data of the second QoS data flow.

20. The computer readable storage medium according to claim 19, wherein when storing the data of the first QoS data flow and the data of the second QoS data flow, the computer program is configured to be executed by the processor to further implement: storing the data of the first QoS data flow and the data of the second QoS data flow according to a receiving sequence of the data of the first QoS data flow and the second QoS data flow;

or, wherein when storing the data of the first QoS data flow and the data of the second QoS data flow, the computer program is configured to be executed by the processor to further implement:

storing the data of the first QoS data flow at a first storage position, and storing the data of the second QoS data flow at a second storage position; or, storing the data of the first QoS data flow and the data of the second QoS data flow at a target storage position, and assigning a label to the data of the first QoS data flow while assigning a different label to the data of the second QoS data flow.

\* \* \* \* \*